US011077766B2

(12) United States Patent
Whaling et al.

(10) Patent No.: US 11,077,766 B2
(45) Date of Patent: Aug. 3, 2021

(54) VEHICLE-TO-GRID ENERGY FOR USE WITH HYDROGEN GENERATION

(71) Applicant: Honda Motor Co., Ltd., Tokyo (JP)

(72) Inventors: Jeremy Whaling, Carson, CA (US); Robert M. Uyeki, Torrance, CA (US); Ryan Douglas Roy Harty, Long Beach, CA (US); Sruthi Raju Nadimpalli, Long Beach, CA (US)

(73) Assignee: Honda Motor Co., Ltd., Tokyo (JP)

( * ) Notice: Subject to any disclaimer, the term of this patent is extended or adjusted under 35 U.S.C. 154(b) by 55 days.

(21) Appl. No.: 16/515,744

(22) Filed: Jul. 18, 2019

(65) Prior Publication Data

US 2020/0070680 A1 Mar. 5, 2020

Related U.S. Application Data

(60) Provisional application No. 62/724,750, filed on Aug. 30, 2018.

(51) Int. Cl.
*B60L 53/64* (2019.01)
*B60L 58/30* (2019.01)
(Continued)

(52) U.S. Cl.
CPC ............ *B60L 53/64* (2019.02); *B60L 53/63* (2019.02); *B60L 55/00* (2019.02); *B60L 58/30* (2019.02);
(Continued)

(58) Field of Classification Search
None
See application file for complete search history.

(56) References Cited

U.S. PATENT DOCUMENTS 6,745,105 B1 * 6/2004 Fairlie ..................... C01B 3/00
700/273
6,745,801 B1 * 6/2004 Cohen ..................... C01B 3/02
141/231
(Continued)

FOREIGN PATENT DOCUMENTS

WO 2005071815 A1 8/2005

OTHER PUBLICATIONS

Habib et al., Impact analysis of vehicle-to-grid technology and charging strategies of electric vehicles on distribution networks—A review; Journal of Power Sources, vol. 277, 2015, pp. 205-214.

(Continued)

*Primary Examiner* — Gurkanwaljit Singh
(74) *Attorney, Agent, or Firm* — Stinson LLP

(57) ABSTRACT

A fleet management system includes a market component that monitors a hydrogen market and identifies one or more hydrogen parameters associated with the hydrogen market, an electric vehicle component that analyzes the hydrogen parameters and selectively instructs one or more electric vehicles to provide electricity for generating hydrogen based on the hydrogen parameters, and a hydrogen vehicle component that selectively instructs one or more hydrogen vehicles to obtain at least a portion of the hydrogen generated from the electricity provided by the electric vehicles. The fleet management system enables a fleet of vehicles using a plurality of fuel types to be effectively and efficiently managed. Moreover, the fleet management system allows a hydrogen economy to grow in an economical and pragmatic manner.

19 Claims, 6 Drawing Sheets

(51) Int. Cl.
  *B60L 55/00* (2019.01)
  *G06Q 30/02* (2012.01)
  *B60L 53/63* (2019.01)
  *H01M 8/06* (2016.01)
  *H01M 8/18* (2006.01)
  *H01M 8/04298* (2016.01)
  *H02J 3/38* (2006.01)

(52) U.S. Cl.
  CPC .... *G06Q 30/0201* (2013.01); *H01M 8/04298* (2013.01); *H01M 8/06* (2013.01); *H01M 8/18* (2013.01); *H02J 3/38* (2013.01); *B60L 2260/54* (2013.01); *H02J 2300/30* (2020.01); *H02J 2300/40* (2020.01)

(56) References Cited

U.S. PATENT DOCUMENTS

| | | | | |
|---|---|---|---|---|
| 6,886,609 B2* | 5/2005 | Cohen | ........................ | C01B 3/02 141/231 |
| 7,181,316 B2* | 2/2007 | Fairlie | ................. | H01M 8/0612 700/266 |
| 7,444,189 B1* | 10/2008 | Marhoefer | .............. | H02J 3/382 700/26 |
| 7,928,693 B2 | 4/2011 | Hafner et al. | | |
| 2004/0131508 A1* | 7/2004 | Fairlie | ................. | H01M 8/0656 422/112 |
| 2004/0187950 A1* | 9/2004 | Cohen | ........................ | C01B 3/02 141/1 |
| 2004/0205032 A1 | 10/2004 | Routtenberg et al. | | |
| 2005/0165511 A1* | 7/2005 | Fairlie | ................... | H01M 8/184 700/286 |
| 2007/0282495 A1 | 12/2007 | Kempton et al. | | |
| 2009/0048716 A1* | 2/2009 | Marhoefer | .............. | H02J 3/381 700/291 |
| 2009/0253006 A1* | 10/2009 | Spoto | ..................... | C01B 3/065 429/423 |
| 2013/0252120 A1* | 9/2013 | Robertson | ........... | C01B 13/0207 429/418 |

OTHER PUBLICATIONS

Kempton et al., Vehicle-to-Grid Power: Battery, Hybrid, and Fuel Cell Vehicles as Resources for Distributed Electric Power in California, UCD-ITS-RR-01-03, Jun. 2001, 94-pages.

Lund et al., Review of energy system flexibility measures to enable high levels of variable renewable electricity; 2013, 68-pages.

* cited by examiner

VEHICLE-TO-GRID ENERGY FOR USE WITH HYDROGEN GENERATION

CROSS-REFERENCE TO RELATED APPLICATION

This application claims priority to U.S. Provisional Application Ser. No. 62/724,750, filed on Aug. 30, 2018, which is hereby incorporated by reference in its entirety.

BACKGROUND

The idea of a "hydrogen economy," where hydrogen is used as a fuel for power generation, has been known for some time. Hydrogen has been used, for example, to power at least some known vehicles. The infrastructure for producing, storing, and/or transporting hydrogen, however, is relatively limited, dampening a consumer demand for hydrogen-powered vehicles. Unlike some other known fuels, hydrogen in a consumable fuel form is not naturally available in convenient reservoirs or deposits; rather, hydrogen fuel is often produced (e.g., via steam reformation, water electrolysis). Growing the hydrogen economy, at least through known methods and systems, is relatively risky and/or cost-prohibitive.

SUMMARY

Examples of the disclosure enable a plurality of vehicles to provide vehicle-to-grid energy for use with hydrogen generation. In one aspect, a fleet management system includes a market component that monitors a hydrogen market and identifies one or more hydrogen parameters associated with the hydrogen market, an electric vehicle component that analyzes the hydrogen parameters and selectively instructs one or more electric vehicles to provide electricity for generating hydrogen based on the hydrogen parameters, and a hydrogen vehicle component that selectively instructs one or more hydrogen vehicles to obtain at least a portion of the hydrogen generated from the electricity provided by the electric vehicles.

In another aspect, a method is provided for managing a plurality of vehicles including one or more electric vehicles and one or more hydrogen vehicles. The method includes monitoring a hydrogen market to identify one or more hydrogen parameters associated with the hydrogen market, deciding to implement a hydrogen generation protocol in light of the one or more hydrogen parameters, and instructing the vehicles in accordance with the hydrogen generation protocol, wherein the electric vehicles are instructed to provide electricity for generating hydrogen, and the hydrogen vehicles are instructed to obtain at least a portion of the hydrogen generated from the electricity provided by the electric vehicles.

In yet another aspect, a computing system is provided for use in managing a plurality of vehicles including one or more electric vehicles and one or more hydrogen vehicles. The computing system includes one or more computer storage media including data associated with the plurality of vehicles, one or more charging stations, and one or more hydrogen stations, and computer-executable instructions, and one or more processors. The processors execute the computer-executable instructions to identify one or more hydrogen parameters associated with a hydrogen market, analyze the hydrogen parameters, selectively instruct the electric vehicles to provide electricity for generating hydrogen based on the hydrogen parameters, and selectively instruct the hydrogen vehicles to obtain at least a portion of the hydrogen generated from the electricity provided by the electric vehicles.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Figure 1:
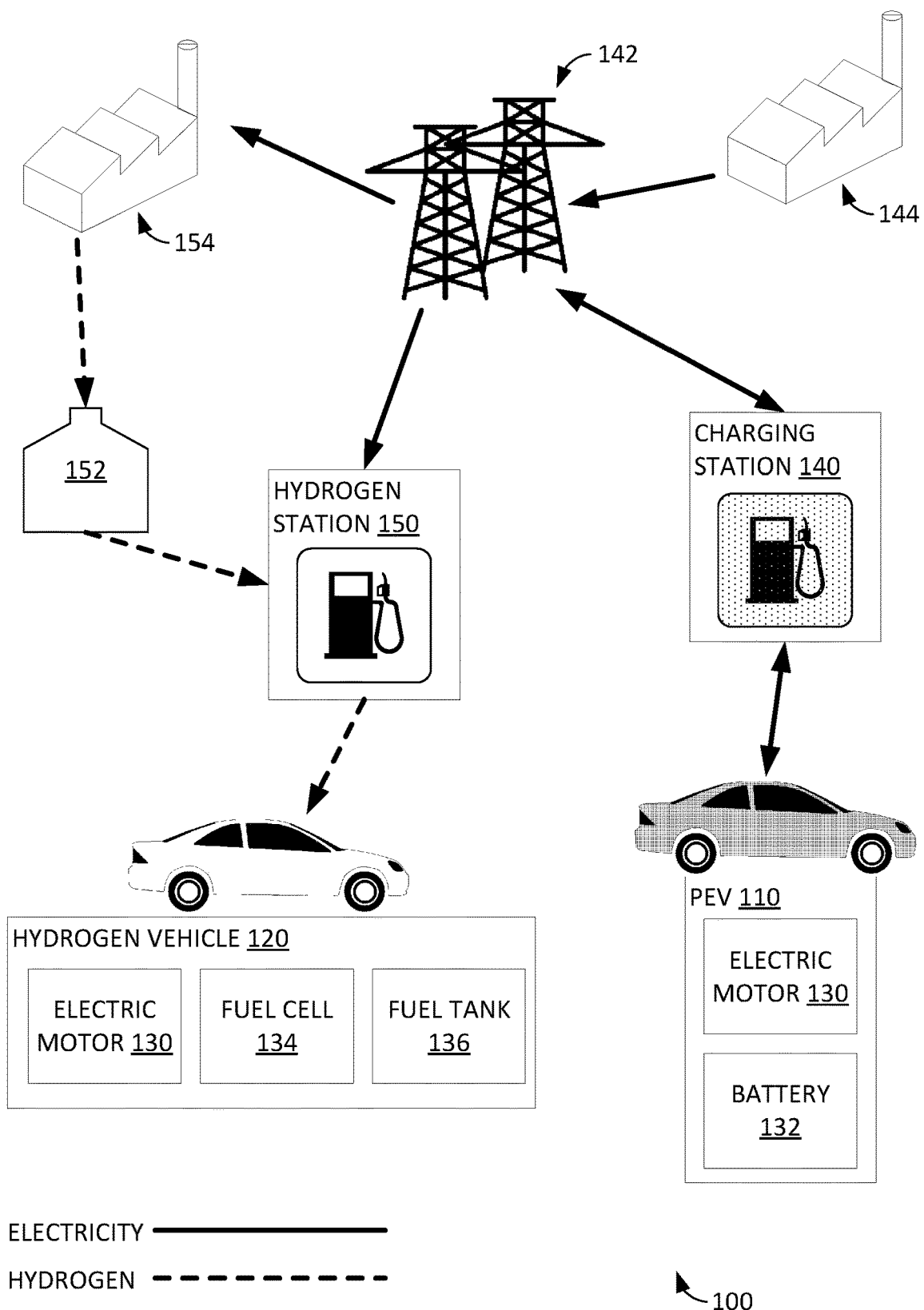
FIG. 1 includes a block diagram of an example vehicle-to-grid (V2G) environment including one or more electric vehicles and one or more hydrogen vehicles.

Corresponding reference characters indicate corresponding parts throughout the drawings. Although specific features may be shown in some of the drawings and not in others, this is for convenience only. In accordance with the examples described herein, any feature of a drawing may be referenced and/or claimed in combination with any feature of any other drawing.

DETAILED DESCRIPTION

The present disclosure relates to asset management systems and, more particularly, to systems and methods for managing a fleet of vehicles to provide vehicle-to-grid (V2G) energy for use with hydrogen generation. Examples described herein enable the fleet of vehicles to be effectively and efficiently managed. For example, one or more market parameters may be tracked to enable one or more vehicles to systematically provide electricity when it is useful and/or economical to do so. Moreover, the examples described herein allow a hydrogen economy to grow in an flexible and pragmatic manner. While the examples described herein are described with respect to the management of vehicles based on market conditions, types of fuel, and desired user experiences, one of ordinary skill in the art would understand and appreciate that the example systems and methods may be used to manage any asset in any environment based on a variety of factors.

FIG. 1 shows an example vehicle-to-grid (V2G) environment 100 including one or more plug-in electric vehicles (PEVs) 110 and one or more hydrogen vehicles 120. Each PEV 110 and hydrogen vehicle 120 includes an electric motor 130 that converts electrical energy or electricity into mechanical power. The electric motor 130 may generate mechanical power, for example, to move or propel a PEV 110 or hydrogen vehicle 120 (e.g., via a drivetrain). The PEVs 110 may power the electric motors 130 using energy stored in onboard battery packs including one or more batteries 132. The hydrogen vehicles 120 may power the electric motors 130 using electricity generated by onboard fuel-cell stacks including one or more fuel cells 134. In some examples, each hydrogen vehicle 120 includes a fuel tank 136 storing fuel (e.g., hydrogen) that may be channeled to the fuel cells 134 for use. While the PEVs 110 and hydrogen vehicles 120 are described and shown as being all-electric or battery electric vehicles (BEV) and hydrogen fuel cell electric vehicles (FCEV), respectively, one of ordinary skill in the art would understand and appreciate that any vehicle that provides electricity (e.g., to the power grid 142) may be an electric vehicle 110 and/or any vehicle that uses a fuel that may be generated using electricity may be a hydrogen vehicle 120 as described herein.

The V2G environment 100 includes one or more charging stations 140 that allow one or more PEVs 110 to draw electricity from a power grid 142 (e.g., for charging batteries 132). The power grid 142 is an interconnected network that allows electricity to be delivered between providers and users. The power grid 142 may include, for example, one or more power stations 144 that generate electricity for delivery through one or more charging stations 140. In some examples, one or more PEVs 110 discharge their batteries 132 (e.g., at charging stations 140) to feed electricity into the power grid 142. Each charging station 140 includes a plurality of user interfaces and/or instrumentation (not shown) that facilitate use and handling. For example, the charging stations 140 may include plugs, sockets, and/or chargers, such as a standard electrical socket, a high-capacity appliance socket, a dedicated electric vehicle (EV) socket, an external charger, and/or an inductive charging mat.

In some examples, the V2G environment 100 includes one or more hydrogen stations 150 that allow the hydrogen vehicles 120 to draw hydrogen from one or more fuel sources 152 (e.g., for filling fuel tanks 136). Example fuel sources 152 include, without limitation, tanks and pipelines. An interconnected network of fuel sources 152, for example, enables hydrogen to be efficiently distributed to one or more users. Each hydrogen station 150 includes a plurality of user interfaces and/or instrumentation (not shown) that facilitate use and handling. For example, the hydrogen stations 150 may include fuel dispensers. In some examples, the fuel sources 152 include or are coupled to one or more hydrogen generators 154 that generate hydrogen. The hydrogen generators 154 may include one or more electrolysers, for example, that generate hydrogen by passing electricity (e.g., from power grid 142) through water to decompose the water into oxygen ($O_2$) and hydrogen gas ($H_2$).

Figure 2:
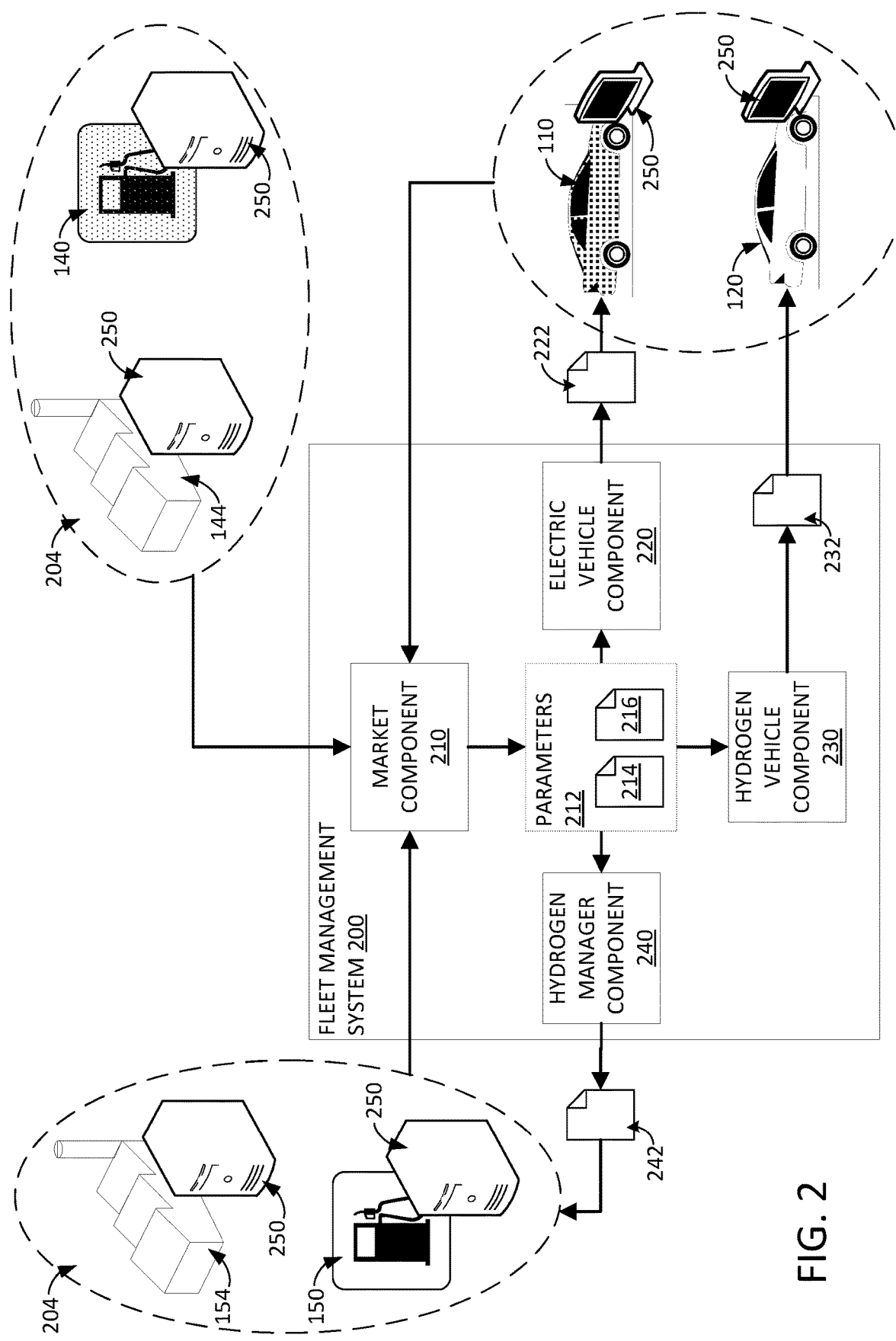
FIG. 2 includes a block diagram of an example fleet management system that may be used to manage a fleet of vehicles, such as the electric vehicles and hydrogen vehicles shown in FIG. 1.

FIG. 2 shows an example fleet management system 200 that may be used to manage a fleet 202 of vehicles (e.g., PEV 110, hydrogen vehicle 120) in an environment (e.g., V2G environment 100). The fleet management system 200 monitors one or more markets 204 to facilitate coordinating charging and fueling decisions for the fleet 202. Example markets 204 include, without limitation, electricity markets, hydrogen markets, fuel markets, energy markets, and the like, as well as any combination and/or section thereof. The markets 204 may be aggregated or clustered based on any factor, such as geographic region, function, responsibility, industry, line of business, product line, customer segment, sales channel, and the like.

The markets 204 may be monitored, for example, using a market component 210. In some examples, the market component 210 monitors a market 204 to identify one or more parameters 212 associated with the market 204. Parameters 212 associated with an electricity market and/or hydrogen market, for example, may be identified by communicating with one or more charging stations 140 and/or hydrogen stations 150, respectively.

Parameters 212 may include one or more demand parameters 214 and/or one or more supply parameters 216. Demand parameters 214 may be identified by communicating with one or more users (e.g., hydrogen vehicles 120). Supply parameters 216 may be identified by communicating with one or more providers (e.g., hydrogen generator 154). In some examples, the market component 210 identifies one or more demand parameters 214 associated with a first section of the hydrogen market, and one or more supply parameters 216 associated with a second section of the hydrogen market. Example demand parameters 214 include, without limitation, request quantities, storage quantities, user locations, request times, prices (per unit), and delivery conditions (e.g., rate, pressure, temperature, quality). Example supply parameters 216 include, without limitation, supply quantities, storage levels, provider locations, available times, production capacities, prices (per unit), and delivery conditions.

In some examples, the market component 210 identifies parameters 212 over a period of time to determine or identify one or more trends or patterns in the market 204. In this manner, the PEVs 110 may be directed and/or operated to provide electricity (e.g., for hydrogen generation) when and/or where the electricity price (per unit) is relatively low, and/or to feed electricity into the power grid 142 when and/or where the electricity price is relatively high. Additionally, the hydrogen vehicles 120 may be directed and/or operated to fill their fuel tanks 136 when and/or where the hydrogen price (per unit) is relatively low.

The fleet management system 200 includes an electric vehicle component 220 configured to analyze the parameters 212, and generate one or more instructions 222 for directing and/or operating the PEVs 110 in light of the parameters 212. For example, the electric vehicle component 220 may analyze the parameters 212 to identify or determine a hydrogen demand, and generate instructions 222 based on the hydrogen demand. If the hydrogen demand is relatively high, the PEVs 110 may be instructed to provide electricity for hydrogen generation. On the other hand, if the hydrogen demand is relatively low, the PEVs 110 may be instructed to save or store the energy (e.g., in batteries 132). Hydrogen demand may be determined, for example, by identifying a quantity of requests for hydrogen (e.g., via hydrogen vehicles 120 and/or hydrogen stations 150). Larger quantities of hydrogen requests may yield a greater hydrogen demand; conversely, smaller quantities of hydrogen requests may yield a lesser hydrogen demand. For another example, hydrogen demand may also be determined by identifying a quantity or proportion of hydrogen generators 154 that are actively generating hydrogen. A larger proportion of active hydrogen generators 154 may be a result of a greater hydrogen demand; conversely, a smaller proportion of active hydrogen generators 154 may be a result of a lesser hydrogen demand.

Additionally or alternatively, the electric vehicle component 220 may analyze the parameters 212 to identify or determine a hydrogen supply, and generate instructions 222 based on the hydrogen supply. If the hydrogen supply is relatively low, the PEVs 110 may be instructed to provide electricity for hydrogen generation. On the other hand, if the hydrogen supply is relatively high, the PEVs 110 may be instructed to save or store the energy (e.g., in batteries 132). Hydrogen supply may be determined, for example, by identifying one or more storage levels (e.g., at hydrogen stations 150, fuel sources 152, and/or hydrogen generators 154). Higher storage levels may yield a greater hydrogen supply; conversely, lower storage levels may yield a lesser hydrogen supply.

In some examples, the electric vehicle component 220 analyzes the parameters 212 to identify an electricity price, and generate instructions 222 based on the electricity price. For example, if the electricity price is relatively low, the PEVs 110 may be instructed to provide electricity for hydrogen generation. On the other hand, if the electricity price is relatively high, the PEVs 110 may be instructed to feed electricity into the power grid 142. Electricity prices may be obtained, for example, from one or more charging stations 140 and/or power stations 144.

The fleet management system 200 includes a hydrogen vehicle component 230 configured to generate one or more instructions 232 for directing and/or operating the hydrogen vehicles 120. In some examples, the hydrogen vehicle component 230 analyzes the parameters 212, and generates instructions 232 based on the parameters 212. For example, the hydrogen vehicle component 230 may analyze the parameters 212 to identify a hydrogen price, and generate instructions 232 based on the hydrogen price. If the hydrogen price is relatively low, the hydrogen vehicles 120 may be instructed to fill their fuel tanks 136 with hydrogen. On the other hand, if the hydrogen price is relatively high, the hydrogen vehicles 120 may be instructed to stop, travel at more fuel-efficient rates, and/or take more fuel-efficient routes (e.g., to conserve fuel). Hydrogen prices may be obtained, for example, from one or more hydrogen stations 150 and/or hydrogen generators 154.

In some examples, the hydrogen vehicle component 230 analyzes the parameters 212 to identify one or more fuel levels (e.g., at the fuel tanks 136), and generates instructions 232 based on the fuel levels. If the fuel level associated with a particular hydrogen vehicle 120 is relatively low, the hydrogen vehicle 120 may be instructed to fill its fuel tank 136 with hydrogen. On the other hand, if the fuel level is relatively high, the hydrogen vehicle 120 may be instructed to operate under standard operating conditions. Fuel levels may be obtained, for example, from one or more hydrogen vehicles 120.

Additionally or alternatively, the hydrogen vehicle component 230 may analyze the parameters 212 to identify or determine a hydrogen supply (e.g., in the hydrogen market), and generate instructions 232 based on the hydrogen supply. If the hydrogen supply is relatively low, the hydrogen vehicles 120 may be instructed to save or store their hydrogen (e.g., in fuel tanks 136). On the other hand, if the hydrogen supply is relatively high, the hydrogen vehicles 120 may be instructed to operate under standard operating conditions. Hydrogen supply may be determined, for example, by identifying one or more storage levels (e.g., at hydrogen stations 150, fuel sources 152, and/or hydrogen generators 154). Higher storage levels may yield a greater hydrogen supply; conversely, lower storage levels may yield a lesser hydrogen supply.

In some examples, the fleet management system 200 includes a hydrogen manager component 240 configured to manage one or more hydrogen stations 150, fuel sources 152, and/or hydrogen generators 154. In this manner, the fleet management system 200 may have at least some control over hydrogen generated from electricity provided by PEVs 110. In some examples, the hydrogen manager component 240 allocates or reserves at least a portion of the hydrogen generated from electricity provided by PEVs 110 for use by the hydrogen vehicles 120. That is, at least some hydrogen generated from electricity provided by the fleet 202 is set aside so that it may be used by the fleet 202. In this manner, the hydrogen vehicle component 230 may direct and/or operate the hydrogen vehicles 120 to obtain at least the portion of the hydrogen generated from the electricity provided by the PEVs 110 (e.g., at the hydrogen stations 150).

In some examples, the hydrogen manager component 240 analyzes the parameters 212 to identify or determine a hydrogen supply, and generates instructions 242 based on the hydrogen supply. If the hydrogen supply is relatively low, the hydrogen generators 154 may be instructed to generate hydrogen and the hydrogen stations 150 and/or fuel sources 152 may be instructed to save or store the hydrogen (e.g., to replenish the hydrogen supply). On the other hand, if the hydrogen supply is relatively high, the hydrogen stations 150, fuel sources 152, and/or hydrogen generators 154 may be instructed to operate under standard operating conditions (e.g., provide hydrogen for use or consumption). Hydrogen supply may be determined, for example, by identifying one or more storage levels (e.g., at hydrogen stations 150, fuel sources 152, and/or hydrogen generators 154). Higher storage levels may yield a greater hydrogen supply; conversely, lower storage levels may yield a lesser hydrogen supply.

In some examples, the electric vehicle component 220, hydrogen vehicle component 230, and/or hydrogen manager component 240 determines and/or adjusts instructions 222, instructions 232, and/or instructions 242, respectively, in light of one or more parameters 212 and/or one or more other instructions (e.g., instructions 222, instructions 232, instructions 242). In this manner, the fleet 202 and/or market 204 may be managed based on user-oriented factors (e.g., demand parameters 214), provider-oriented factors (e.g., supply parameters 216), and/or resource-oriented factors.

The fleet management system 200 includes one or more receivers, transmitters, and/or transceivers that enable the fleet management system 200 and its components (e.g., market component 210, electric vehicle component 220, hydrogen vehicle component 230, hydrogen manager component 240) to communicate with one or more remote devices 250 (e.g., at PEVs 110, hydrogen vehicles 120, charging stations 140, power grids 142, power stations 144, hydrogen stations 150, fuel sources 152, and/or hydrogen generators 154) using one or more communication protocols. For example, the electric vehicle component 220, hydrogen vehicle component 230, and/or hydrogen manager component 240 may transmit or provide one or more directions and/or instructions to PEVs 110, hydrogen vehicles 120, and/or hydrogen stations 150, fuel sources 152, and hydrogen generators 154, respectively, at one or more remote devices 250. Example communication protocols include, without limitation, a BLUETOOTH® brand communication protocol, a ZIGBEE® brand communication protocol, a Z-WAVE™ brand communication protocol, a WI-FI® brand communication protocol, a near field communication (NFC) communication protocol, a radio-frequency identification (RFID) communication protocol, and a cellular data communication protocol (BLUETOOTH® is a registered trademark of Bluetooth Special Interest Group ZIGBEE® is a registered trademark of ZigBee Alliance Corporation, and Z-WAVE™ is a trademark of Sigma Designs, Inc. WI-FI® is a registered trademark of the Wi-Fi Alliance).

Figure 3:
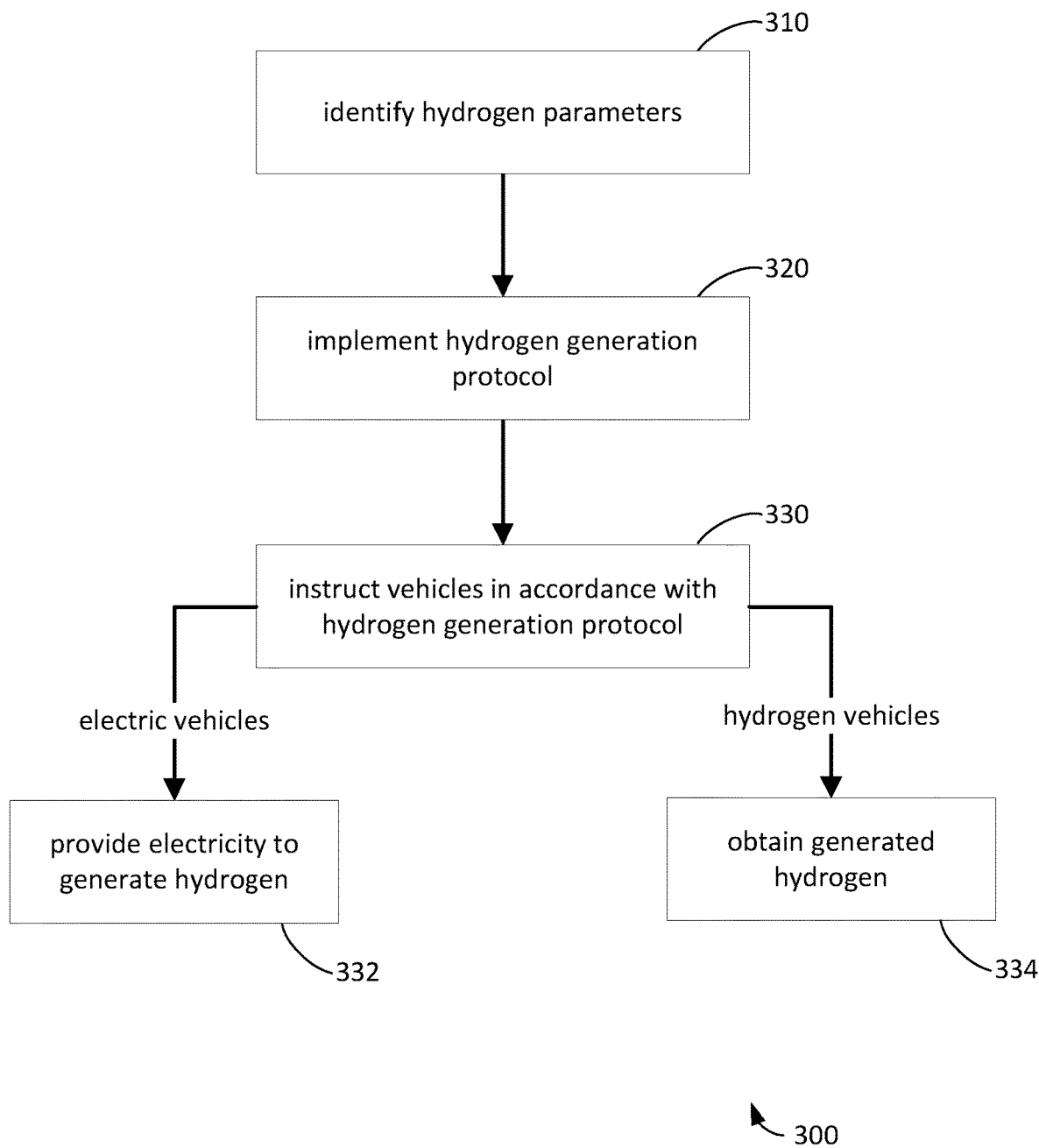
FIG. 3 includes a flowchart of an example method of managing a fleet using a system, such as the fleet management system shown in FIG. 2.

FIG. 3 shows an example method 300 of managing a fleet 202 (shown in FIG. 2) using a fleet management system 200

(shown in FIG. 2). The fleet 202 may include, for example, one or more PEVs 110 and one or more hydrogen vehicles 120. The method 300 includes monitoring a hydrogen market (e.g., market 204) to identify one or more hydrogen parameters (e.g., parameters 212) at operation 310. In some examples, one or more demand parameters 214 associated with a first section of the hydrogen market and one or more supply parameters 216 associated with a second section of the hydrogen market are identified. The demand parameters 214 and/or supply parameters 216 may be identified over a period of time, such that one or more trends in the hydrogen market may be determined based on the demand parameters 214 and/or supply parameters 216.

A hydrogen generation protocol and/or one or more instructions is implemented at operation 320. The hydrogen generation protocol may be selected for implementation, for example, in light of the hydrogen parameters and/or trends in the hydrogen market. In some examples, the demand parameters 214 and/or supply parameters 216 are analyzed, and the hydrogen generation protocol is selected based at least in part on the demand parameters 214 and/or supply parameters 216. Additionally or alternatively, it may be determined whether the hydrogen parameters satisfy a predetermined threshold. The hydrogen generation may be selected, for example, on condition that the predetermined threshold is satisfied. In some examples, one or more electricity parameters associated with an electricity market are identified and analyzed to determine whether to select the hydrogen generation protocol based at least in part on the electricity parameters.

One or more vehicles (e.g., PEVs 110, hydrogen vehicles 120) are selectively instructed at operation 330. The vehicles may be selectively instructed, for example, on condition that one or more hydrogen parameters satisfy a predetermined threshold. In some examples, the vehicles are selectively instructed in accordance with the hydrogen generation protocol. For example, the PEVs 110 may be instructed to provide electricity for generating hydrogen at operation 332, and the hydrogen vehicles 120 may be instructed to obtain at least a portion of the hydrogen generated from the electricity provided by the PEVs 110 at operation 334. In some examples, a particular PEV 110 or hydrogen vehicle 120 is selected to perform one or more operations based on a vehicle status, a vehicle location, a fuel level, a vehicle range, and/or a traffic condition. One or more instructions may be provided to the PEV 110 or hydrogen vehicle 120 (e.g., at remote device 250) for performing the operations in accordance with one or more instructions and/or with a hydrogen generation protocol.

In some examples, the hydrogen generated from the electricity provided by the PEVs 110 is managed. For example, one or more supply parameters 216 associated with the generated hydrogen may be identified, and it may be determined whether the supply parameters 216 satisfy a predetermined threshold. The hydrogen generation protocol may be selected and/or the hydrogen vehicles 120 may be selectively instructed, for example, on condition that the predetermined threshold is satisfied.

Figure 4:
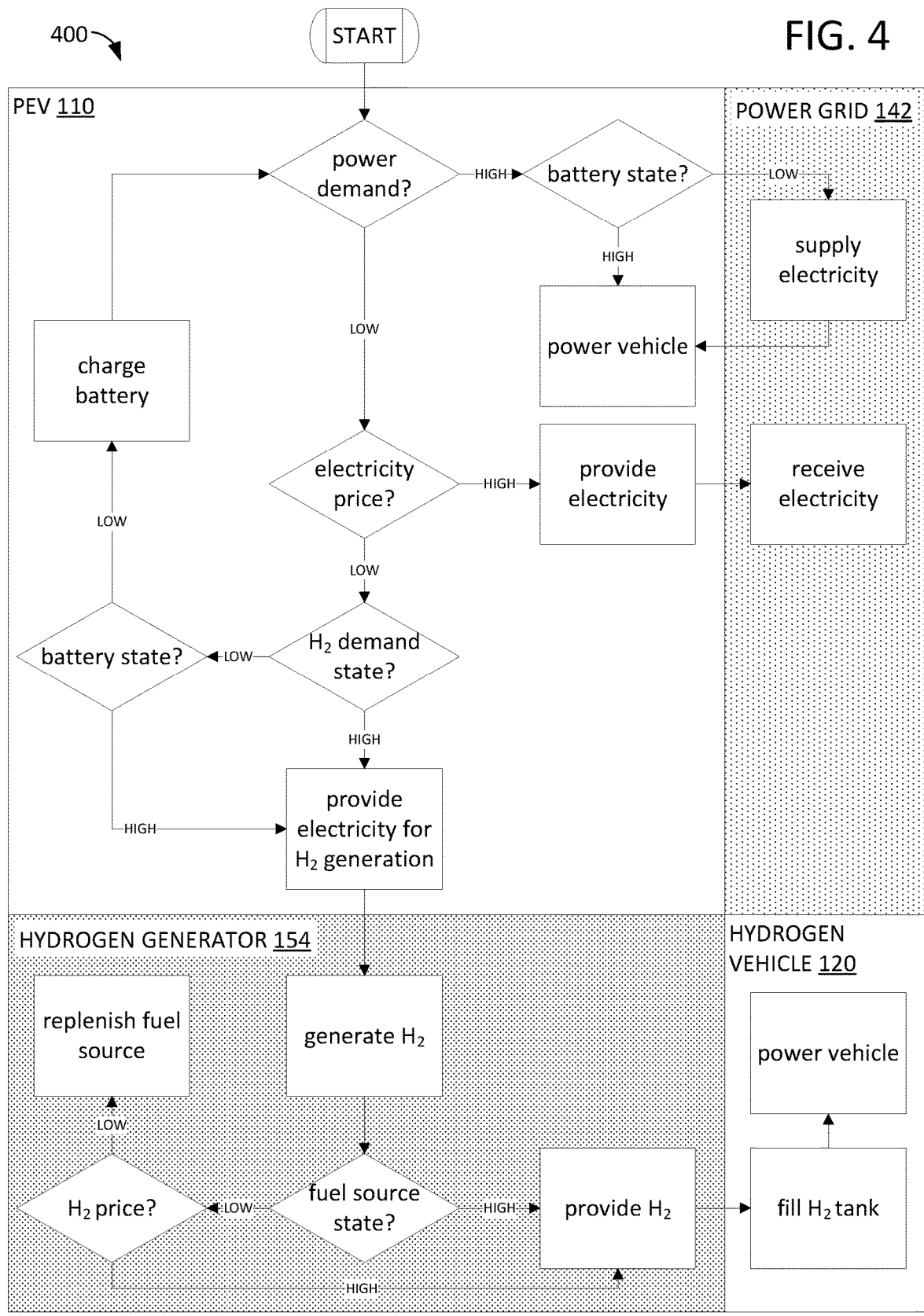
FIG. 4 includes a flow diagram of an example method of managing a fleet using a system, such as the fleet management system shown in FIG. 2.

FIG. 4 shows an example method 400 of managing a fleet 202 (shown in FIG. 2) using a fleet management system 200 (shown in FIG. 2). The fleet management system 200 may use the method 400, for example, to strategically generate, store, transfer, and/or sell electricity and/or hydrogen. When a PEV 110 demands power (e.g., for a particular operation), energy from one or more batteries 132 and/or from the power grid 142 may be used to power the PEV 110, depending on a state of the batteries 132 (e.g., state of charge). For example, the PEV 110 may be powered using energy from the batteries 132 as long as the state of charge is sufficient (e.g., the state of charge is greater than a predetermined threshold). If the batteries 132 have little or no energy, the PEV 110 may be powered using electricity from the power grid 142.

On the other hand, if the PEV 110 demands little or no power, the fleet management system 200 may determine whether to save or store energy (e.g., in batteries 132), charge the batteries 132, feed electricity to the power grid 142, or provide electricity for hydrogen generation, depending on an electricity price, a hydrogen demand, and/or a state of the batteries 132. In some examples, the PEV 110 is instructed to provide electricity for hydrogen production when the electricity price is relatively low (e.g., the electricity price is less than a predetermined threshold) and the hydrogen demand is relatively high (e.g., the hydrogen demand is greater than a predetermined threshold). It may be more cost effective to feed electricity into the power grid 142, for example, when the electricity price is relatively high. If the electricity price is relatively low, the fleet management system 200 may decide to provide electricity for hydrogen production as long as the hydrogen demand is relatively high. If the hydrogen demand is relatively low, however, the fleet management system 200 may check on the state of the batteries 132 before providing electricity for hydrogen production.

The hydrogen generator 154 passes electricity (e.g., provided by the PEV 110) through water to generate hydrogen. The generated hydrogen may be used, for example, to fill one or more fuel tanks 136 (e.g., at hydrogen vehicle 120) or replenish a fuel source 152, depending on a state of the fuel source 152 and/or a hydrogen price. In some examples, the hydrogen generator 154 is instructed to provide hydrogen (e.g., to hydrogen vehicle 120) as long as the state of the fuel source 152 is sufficient (e.g., the fuel level is greater than a predetermined threshold). If the fuel level is relatively low, however, the hydrogen may still be provided as long as the hydrogen price warrants the decision (e.g., the hydrogen price is greater than a predetermined threshold).

Figure 5:
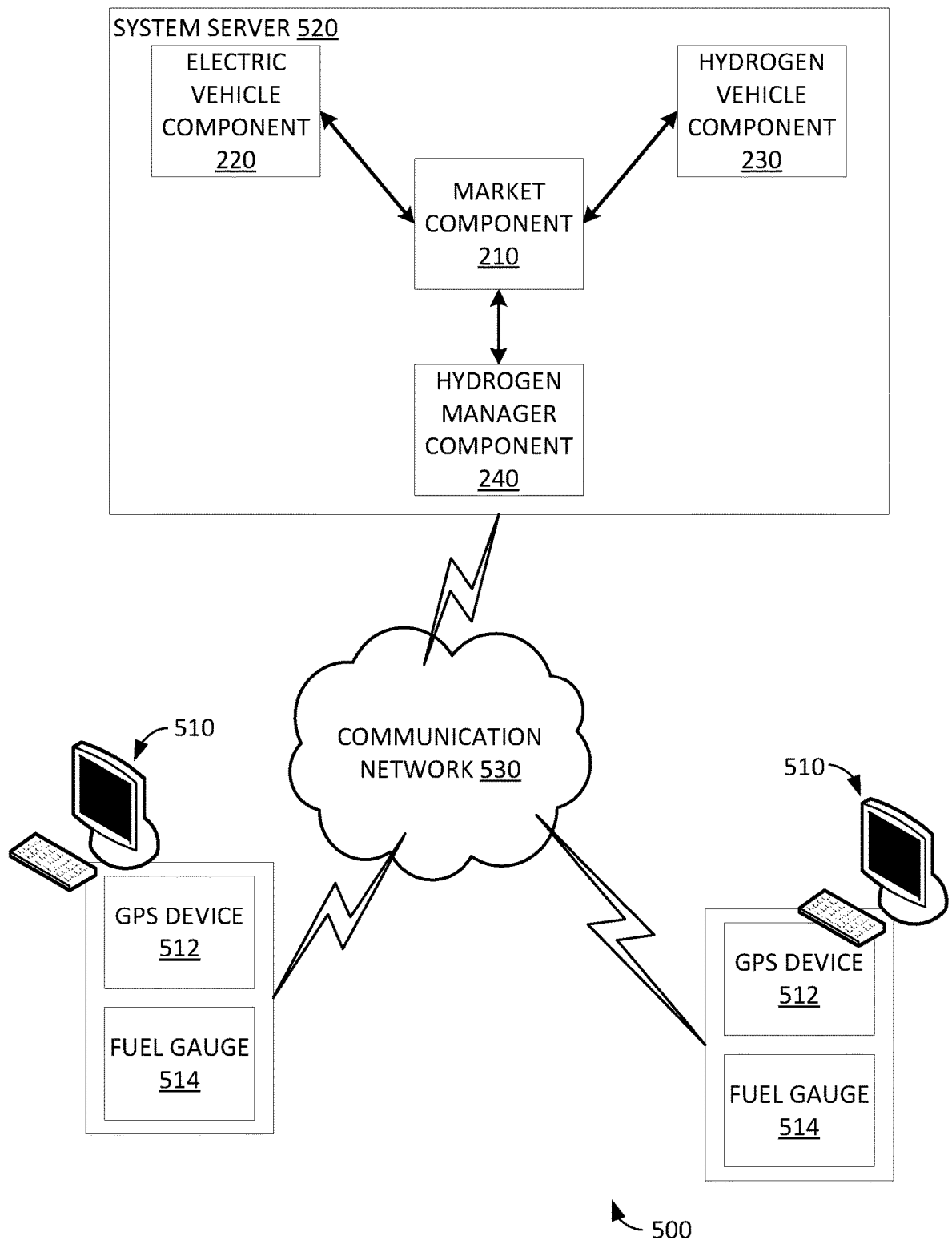
FIG. 5 includes a block diagram of an example cloud-based environment for managing a fleet using a system, such as the fleet management system shown in FIG. 2.

FIG. 5 shows an example cloud-based environment 500 including a plurality of computing devices 510 (e.g., remote device 250). One or more computing devices 510 (e.g., at PEV 110 and/or hydrogen vehicle 120) include a global positioning system (GPS) device 512 that identifies a vehicle location and/or traffic condition, and a fuel gauge 514 that identifies a fuel level and/or vehicle range. The computing devices 510 include one or more client-side applications that perform one or more operations at the computing devices 510 while one or more operations are performed remotely. For example, the client-side applications may allow the computing devices 510 to communicate with one or more computing systems (e.g., the "cloud") that perform one or more back-end operations using one or more counterpart applications (e.g., server-side applications) and/or through one or more server-side services. In some examples, the computing devices 510 transmit one or more signals associated with the GPS device 512 and/or fuel gauge 514 to a system server 520 (e.g., fleet management system 200) for back-end processing.

The system server 520 provides a shared pool of configurable computing resources to perform one or more back-end operations. The system server 520 may host or manage one or more server-side applications that include or are associated with fleet management technology, such as a GPS navigation application configured to provide navigation and traffic data and a resource management application configured to monitor fuel prices at one or more charging stations 140 and/or hydrogen stations 150 over a period of time. The system server 520 may include or store data, such as parameters 212, demand parameters 214, supply parameters 216, instructions 222, instructions 232, and/or instructions 242. The data may be used, for example, to predict fuel demand, request quantities, fuel supply, supply quantities, storage quantities, storage levels, fuel levels, user locations, provider locations, request times, available times, production capacities, electricity prices, fuel prices, and/or delivery conditions. In some examples, the system server 520 includes a market component 210, an electric vehicle component 220, a hydrogen vehicle component 230, and a hydrogen manager component 240.

The cloud-based environment 500 includes one or more communication networks 530 that allow information to be communicated between a plurality of computing systems coupled to the communication networks 530 (e.g., computing devices 510, system server 520). Example communication networks 530 include, without limitation, a cellular network, the Internet, a personal area network (PAN), a local area network (LAN), and a wide area network (WAN). In some examples, the system server 520 includes, is included in, or is coupled to one or more artificial neural networks that "learn" and/or evolve based on information or insights gained through the processing of parameters 212, demand parameters 214, supply parameters 216, instructions 222, instructions 232, and/or instructions 242.

One or more interfaces (not shown) may facilitate communication within the cloud-based environment 500. The interfaces may include one or more gateways that allow the system server 520 and computing devices 510 to communicate with each other and/or with one or more other computing systems for performing one or more operations. For example, the gateways may format data and/or control one or more data exchanges using an Open Systems Interconnection (OSI) model that enables the computing systems (e.g., computing devices 510, system server 520) to communicate using one or more communication protocols. In some examples, the gateways identify and/or locate one or more target computing systems to selectively route data in and/or through the cloud-based environment 500.

Figure 6:
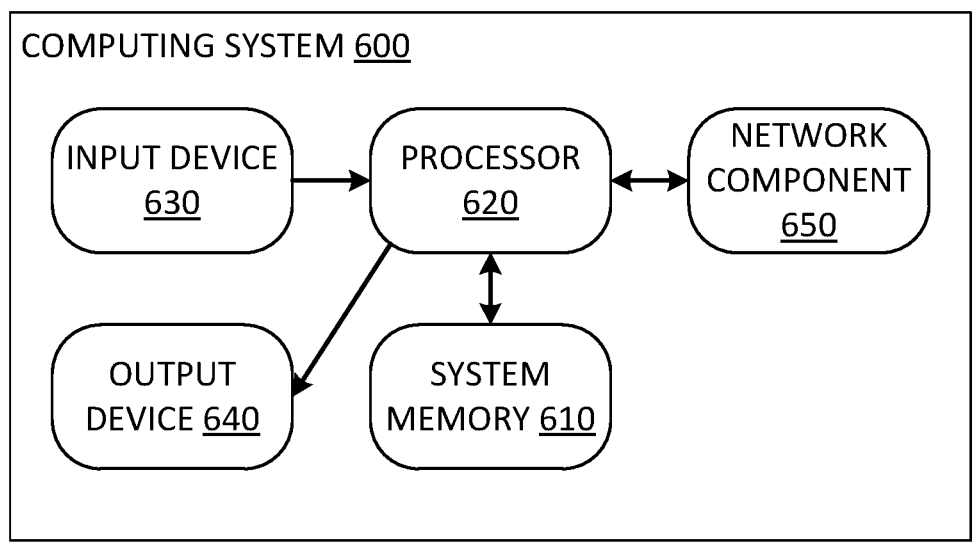
FIG. 6 includes a block diagram of an example computing system that may be used to manage a fleet using a system, such as the fleet management system shown in FIG. 2.

FIG. 6 shows an example computing system 600 configured to perform one or more computing operations. While some examples of the disclosure are illustrated and described herein with reference to the computing system 600 being included in a fleet management system 200 (shown in FIG. 2) and/or a system server 520 (shown in FIG. 5), aspects of the disclosure are operable with any computing system (e.g., remote device 250, computing devices 510) that executes instructions to implement the operations and functionality associated with the computing system 600. The computing system 600 shows only one example of a computing environment for performing one or more computing operations and is not intended to suggest any limitation as to the scope of use or functionality of the disclosure.

In some examples, the computing system 600 includes a system memory 610 (e.g., computer storage media) and a processor 620 coupled to the system memory 610. The processor 620 may include one or more processing units (e.g., in a multi-core configuration). Although the processor 620 is shown separate from the system memory 610, examples of the disclosure contemplate that the system memory 610 may be onboard the processor 620, such as in some embedded systems.

The system memory 610 stores data associated with one or more users, PEVs 110, hydrogen vehicles 120, charging stations 140, and/or hydrogen stations 150, and computer-executable instructions, and the processor 620 is programmed or configured to execute the computer-executable instructions for implementing aspects of the disclosure using, for example, the fleet management system 200. For example, at least some data may be associated with one or more PEVs 110 and/or hydrogen vehicles 120 (e.g., demand parameters 214), and/or charging stations 140, power grids 142, power stations 144, hydrogen stations 150, fuel sources 152, and/or hydrogen generators 154 (e.g., supply parameters 216), such that the computer-executable instructions enable the processor 620 to manage or control one or more operations of a vehicle (e.g., PEV 110, hydrogen vehicle 120) and/or fleet management system 200.

The system memory 610 includes one or more computer-readable media that allow information, such as the computer-executable instructions and other data, to be stored and/or retrieved by the processor 620. In some examples, the processor 620 executes the computer-executable instructions to monitoring a market 204 to identify one or more parameters 212 associated with the market 204, analyzing the parameters 212 to select a fuel generation protocol, and instructing one or more vehicles (e.g., PEV 110, hydrogen vehicle 120) in accordance with the selected fuel generation protocol (e.g., to provide electricity for generating hydrogen, and/or to obtain at least a portion of generated hydrogen).

By way of example, and not limitation, computer-readable media may include computer storage media and communication media. Computer storage media are tangible and mutually exclusive to communication media. For example, the system memory 610 may include computer storage media in the form of volatile and/or nonvolatile memory, such as read only memory (ROM) or random access memory (RAM), electrically erasable programmable read-only memory (EEPROM), solid-state storage (SSS), flash memory, a hard disk, a floppy disk, a compact disc (CD), a digital versatile disc (DVD), magnetic tape, or any other medium that may be used to store desired information that may be accessed by the processor 620. Computer storage media are implemented in hardware and exclude carrier waves and propagated signals. That is, computer storage media for purposes of this disclosure are not signals per se.

A user or operator may enter commands and other input into the computing system 600 through one or more input devices 630 coupled to the processor 620. The input devices 630 are configured to receive information. Example input device 630 include, without limitation, a pointing device (e.g., mouse, trackball, touch pad, joystick), a keyboard, a game pad, a controller, a microphone, a camera, a gyroscope, an accelerometer, a position detector, and an electronic digitizer (e.g., on a touchscreen). Information, such as text, images, video, audio, and the like, may be presented to a user via one or more output devices 640 coupled to the processor 620. The output devices 640 are configured to convey information. Example, output devices 640 include, without limitation, a monitor, a projector, a printer, a speaker, a vibrating component. In some examples, an output device 640 is integrated with an input device 630 (e.g., a capacitive touch-screen panel, a controller including a vibrating component).

One or more network components 650 may be used to operate the computing system 600 in a networked environment using one or more logical connections. Logical connections include, for example, local area networks, wide area networks, and the Internet. The network components 650 allow the processor 620, for example, to convey information to and/or receive information from one or more remote devices, such as another computing system or one or more remote computer storage media. Network components 650 may include a network adapter, such as a wired or wireless network adapter or a wireless data transceiver.

Example systems and methods for managing fleets are described herein and illustrated in the accompanying drawings. For example, the automated fleet management system described herein is configured to manage a fleet of vehicles. The examples described herein selectively instruct one or more electric vehicles to provide electricity for generating fuel (e.g., hydrogen) based on one or more market parameters, such as fuel supply and/or fuel demand. Moreover, the examples described herein facilitate the strategic charging and/or fueling of the fleet. For example, the fleet management system may coordinate servicing and fueling decisions and/or operations to charge one or more batteries at lower fuel prices and discharge to the power grid at higher fuel prices. The servicing and/or fueling decisions and/or operations may also be coordinated to direct vehicles of a particular vehicle type to charge or discharge at a particular charging station or hydrogen station and/or at a particular charging or fueling time. Additionally, the servicing and/or fueling decisions may evolve based on information or insight gained over time, resulting in increased efficiency and/or accuracy. This written description uses examples to disclose aspects of the disclosure and also to enable a person skilled in the art to practice the aspects, including making or using the above-described systems and executing or performing the above-described methods.

Having described aspects of the disclosure in terms of various examples with their associated operations, it will be apparent that modifications and variations are possible without departing from the scope of the disclosure as defined in the appended claims. That is, aspects of the disclosure are not limited to the specific examples described herein, and all matter contained in the above description and shown in the accompanying drawings shall be interpreted as illustrative and not in a limiting sense. For example, the examples described herein may be implemented and utilized in connection with many other applications such as, but not limited to, asset management.

Components of the systems and/or operations of the methods described herein may be utilized independently and separately from other components and/or operations described herein. Moreover, the methods described herein may include additional or fewer operations than those disclosed, and the order of execution or performance of the operations described herein is not essential unless otherwise specified. That is, the operations may be executed or performed in any order, unless otherwise specified, and it is contemplated that executing or performing a particular operation before, contemporaneously with, or after another operation is within the scope of the disclosure. Although specific features of various examples of the disclosure may be shown in some drawings and not in others, this is for convenience only. In accordance with the principles of the disclosure, any feature of a drawing may be referenced and/or claimed in combination with any feature of any other drawing.

When introducing elements of the disclosure or the examples thereof, the articles "a," "an," "the," and "said" are intended to mean that there are one or more of the elements. References to an "embodiment" or an "example" of the present disclosure are not intended to be interpreted as excluding the existence of additional embodiments or examples that also incorporate the recited features. The terms "comprising," "including," and "having" are intended to be inclusive and mean that there may be elements other than the listed elements. The phrase "one or more of the following: A, B, and C" means "at least one of A and/or at least one of B and/or at least one of C."

The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A fleet management system for managing a plurality of vehicles including one or more electric vehicles and one or more hydrogen vehicles, the fleet management system comprising:
    a market component that, upon execution by one or more processors, communicates with a plurality of hydrogen providers to determine one or more hydrogen supply parameters associated with a hydrogen market;
    an electric vehicle component that, upon execution by the one or more processors, analyzes the one or more hydrogen supply parameters to determine a hydrogen supply associated with the hydrogen market, and, on condition that the hydrogen supply is less than a predetermined supply level, selectively instructs the one or more electric vehicles to provide electricity for generating hydrogen; and
    a hydrogen vehicle component that, upon execution by the one or more processors, selectively instructs the one or more hydrogen vehicles to obtain at least a portion of the hydrogen generated from the electricity provided by the one or more electric vehicles.

2. The fleet management system of claim 1, wherein the market component is configured to identify one or more hydrogen demand parameters associated with the hydrogen market.

3. The fleet management system of claim 1, wherein the market component is configured to identify one or more hydrogen demand parameters associated with a first section of the hydrogen market, wherein the one or more hydrogen supply parameters are associated with a second section of the hydrogen market.

4. The fleet management system of claim 1, wherein the market component is configured to identify a plurality of demand parameters and a plurality of supply parameters associated with the hydrogen market over a period of time, and determine one or more trends in the hydrogen market based on the plurality of demand parameters and the plurality of supply parameters, the plurality of supply parameters including the one or more hydrogen supply parameters.

5. The fleet management system of claim 1, wherein the market component is configured to determine one or more hydrogen demand parameters associated with the hydrogen market, and the electric vehicle component is configured to analyze the one or more hydrogen demand parameters to determine a hydrogen demand, and, on condition that the hydrogen demand is greater than a predetermined demand level, selectively instruct the one or more electric vehicles to provide the electricity.

6. The fleet management system of claim 1, wherein the hydrogen vehicle component is configured to instruct the one or more hydrogen vehicles to obtain the at least the portion of the hydrogen on condition that the hydrogen supply is less than the predetermined supply level.

7. The fleet management system of claim 1, wherein the market component is configured to identify one or more electricity parameters associated with an electricity market, and wherein the electric vehicle component is configured to analyze the one or more electricity parameters.

8. The fleet management system of claim 1, further comprising a hydrogen manager component configured to manage the hydrogen generated from the electricity provided by the one or more electric vehicles.

9. The fleet management system of claim 1, further comprising a hydrogen manager component configured to identify one or more hydrogen storage parameters associated with the hydrogen generated from the electricity provided by the one or more electric vehicles, and analyze the one or more hydrogen storage parameters to determine a hydrogen storage level.

10. A computer-implemented method for managing a plurality of vehicles including one or more electric vehicles and one or more hydrogen vehicles, the method comprising:
- communicating with a plurality of hydrogen providers over a communication network to identify one or more hydrogen supply parameters associated with a hydrogen market;
- analyzing the one or more hydrogen supply parameters to determine a hydrogen supply associated with the hydrogen market; and
- on condition that the hydrogen supply is less than a predetermined supply level, generating a plurality of computer-executable instructions in accordance with a hydrogen generation protocol;
- transmitting a first instruction of the plurality of computer-executable instructions to the one or more electric vehicles such that the one or more electric vehicles are instructed to provide electricity for generating hydrogen; and
- transmitting a second instruction of the plurality of computer-executable instructions to the one or more hydrogen vehicles such that the one or more hydrogen vehicles are instructed to obtain at least a portion of the hydrogen generated from the electricity provided by the one or more electric vehicles.

11. The method of claim 10, further comprising analyzing one or more hydrogen demand parameters associated with the hydrogen market, wherein the plurality of computer-executable instructions are generated based at least in part on the one or more hydrogen demand parameters.

12. The method of claim 11,
wherein analyzing the one or more hydrogen demand parameters comprises analyzing the one or more hydrogen demand parameters associated with a first section of the hydrogen market; and
wherein analyzing the one or more hydrogen supply parameters comprises analyzing the one or more hydrogen supply parameters associated with a second section of the hydrogen market.

13. The method of claim 10, wherein monitoring the hydrogen market comprises:
- identifying a plurality of demand parameters and a plurality of supply parameters over a period of time, wherein the plurality of supply parameters includes the one or more hydrogen supply parameters; and
- determining one or more trends in the hydrogen market based on the plurality of demand parameters and the plurality of supply parameters, wherein the plurality of computer-executable instructions are generated based at least in part on the one or more trends in the hydrogen market.

14. The method of claim 10, further comprising:
- identifying one or more electricity parameters associated with an electricity market; and
- analyzing the one or more electricity parameters, wherein the plurality of computer-executable instructions are generated based at least in part on the one or more electricity parameters.

15. The method of claim 10, further comprising managing the hydrogen generated from the electricity provided by the one or more electric vehicles.

16. The method of claim 10, further comprising:
- identifying one or more hydrogen storage parameters associated with the hydrogen generated from the electricity provided by the one or more electric vehicles;
- analyzing the one or more hydrogen storage parameters to determine a hydrogen storage level; and
- determining whether the hydrogen storage level is greater than a predetermined hydrogen storage level, wherein the plurality of computer-executable instructions are generated on condition that the hydrogen storage level is greater than the predetermined hydrogen storage level.

17. A computing system for use in managing a plurality of vehicles including one or more electric vehicles and one or more hydrogen vehicles, the computing system comprising:
- one or more computer storage media including data associated with the plurality of vehicles, one or more charging stations, and one or more hydrogen stations, and computer-executable instructions; and
- one or more processors configured to execute the computer-executable instructions to:
  - identify one or more hydrogen supply parameters associated with a hydrogen market;
  - analyze the one or more hydrogen supply parameters to determine a hydrogen supply associated with the hydrogen market;
  - on condition that the hydrogen supply is less than a predetermined supply level, generating a plurality of computer-executable instructions in accordance with a hydrogen generation protocol;
  - transmitting a first instruction of the plurality of computer-executable instructions to selectively instruct the one or more electric vehicles to provide electricity for generating hydrogen; and
  - transmitting a second instruction of the plurality of computer-executable instructions to selectively instruct the one or more hydrogen vehicles to obtain at least a portion of the hydrogen generated from the electricity provided by the one or more electric vehicles.

18. The computing system of claim 17, wherein the one or more processors are further configured to execute the computer-executable instructions to:
- identify one or more electricity parameters associated with an electricity market; and
- analyze the one or more electricity parameters.

19. The computing system of claim 17, wherein the one or more processors are further configured to execute the computer-executable instructions to:
- identify one or more hydrogen storage parameters associated with the hydrogen generated from the electricity provided by the one or more electric vehicles; and
- determine whether the one or more hydrogen storage parameters satisfy a predetermined threshold.

* * * * *